J. HUGHES.
SOD TURNING ATTACHMENT FOR PLOWS.
APPLICATION FILED MAY 26, 1919.

1,316,722.

Patented Sept. 23, 1919.

Inventor
James Hughes
By J. M. St. John
Atty.

UNITED STATES PATENT OFFICE.

JAMES HUGHES, OF GALILEE, MOOSE JAW, SASKATCHEWAN, CANADA.

SOD-TURNING ATTACHMENT FOR PLOWS.

1,316,722.   Specification of Letters Patent.   Patented Sept. 23, 1919.

Application filed May 26, 1919. Serial No. 300,000.

*To all whom it may concern:*

Be it known that I, JAMES HUGHES, a citizen of Canada, residing at Galilee, district of Moose Jaw, in the Province of Saskatchewan and Dominion of Canada, have invented certain new and useful Improvements in Sod-Turning Attachments for Plows; and I do hereby declare the following to be a full, clear, and exact description of the invention, such as will enable others skilled in the art to which it appertains to make and use the same.

This invention relates to plows for turning sod, and though primarily intended for use in connection with breaking-plows, is well adapted for any plow employed to turn tough sod.

In sod plowing, the common difficulty is to turn the furrow completely over, or so nearly to reverse it as to make it stay in place, and so make way for the succeeding furrow. It is the annoying and tedious experience of every plowman working in sod ground, that even with the greatest care in gaging the width and depth of the furrow, and in guiding the team and plow, the turning furrow will spring back, behind the operator, and quickly roll to its original position, sometimes for a distance of many feet, or even rods behind. This must of course be rolled over to make way for the next furrow, and to do so by hand is laborious, time-consuming and exasperating. The cause of this action, a failure to properly function on the part of the plow, is mainly twofold: In one case the furrow slice is apt to be cut too wide, and the plow being unable to reverse the whole slice, the furrow must break short of its plowed-side edge. If the sod is tough, the furrow bends, but does not break, and so springs back when the plow has passed. In the other case the entire furrow slice may be lifted by the plow, but instead of turning over, simply slides toward the plowed land, and escapes the proper turning action of the moldboard. This invention is designed to render impossible this imperfect action of the plow, whatever may be the conditions under which the sod is turned.

Figure 1:
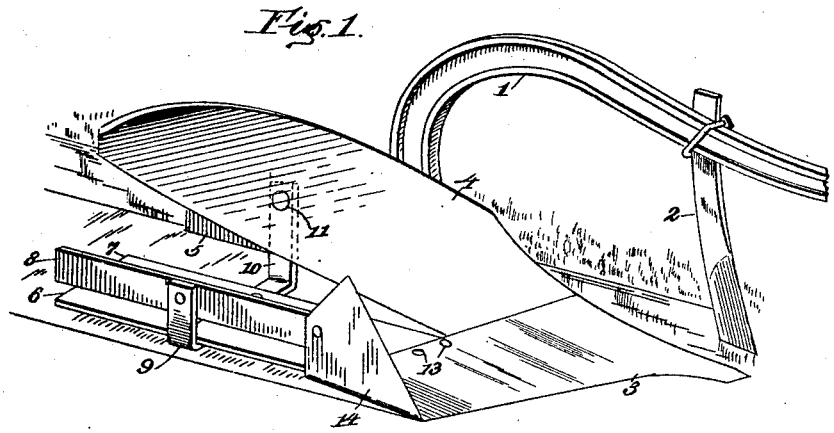
Figure 2:
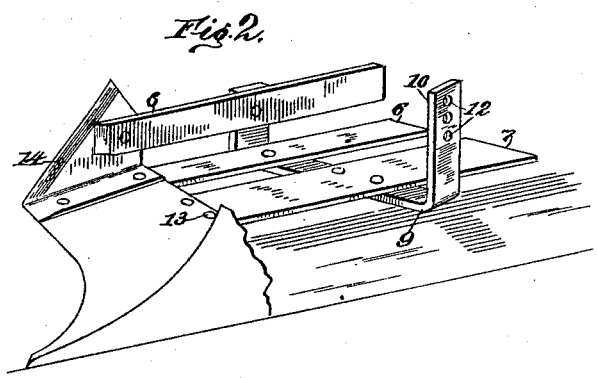

In the accompanying drawing, forming a part of this specification, Figure 1 illustrates in perspective my sod-turning attachment as applied to a breaking-plow. Fig. 2 is a view of the same from the opposite side, the plow being mainly broken away to show the invention more clearly.

The plow itself is of a familiar type, comprising the usual beam, 1, colter 2, share 3, moldboard 4, and landside 5. The structure of the share may, or may not, be modified in connection with my improvements, as will be described presently. Otherwise the plow itself needs no description.

Extending back from the rear of the share is what may for convenience be called a furrow carrier or holder, through and along which the furrow must slide as acted upon by the moldboard. It comprises a bottom, best composed of a plurality of plates 6 and 7, so as not to produce excessive friction as the earth slides along them, a side-plate 8, and a suitable connecting and supporting cross-bar 9, having an upwardly extending standard 10 by which it is bolted to the back side of the moldboard at 11. A series of holes 12 permits adjustment at the point of attachment with the moldboard, so that the bottom may be carried practically level, or pitched, as desired. At the front end the bottom is attached to the rear of the share, near the edge, as indicated at 13. The front end of the side-plate is similarly attached to a vertical blade 14, which may be an integral, upturned part of the share, as indicated in Fig. 1, or an attached part, as shown in Fig. 2. Its front and sharpened edge inclines backwardly and upwardly, and serves as a colter to cut the sod from the under side and at the outer side of the furrow, provided, of course, that the furrow is that wide. In plowing a first furrow it is evident that this blade and the colter will slice the sod with perfect uniformity, and this itself greatly facilitates the turning over of the furrow. The blade and the side-plate extending back from it should be practically parallel with the landside of the plow.

The action of this sod-turning device has already been indicated. The blade severs the furrow slice at its pivotal side, so that it presents no resistance to turning over. The bottom supports the furrow while the moldboard is performing its function of turning the furrow, and the side plate holds the furrow-slice from slipping sidewise and away from the moldboard while the latter is performing its proper function. The practical result is that the sod is completely and uniformly turned over, leaving a comparatively smooth, plowed field to be reduced to proper tillage by the disk or harrow.

The furrow-holding portion of the device is best made of strips of wrought steel, the interspaces allowing loose dirt to pass through, and preventing accumulations in angles and elsewhere to obstruct the easy running of the plow.

Having thus described my invention, I claim:

1. A sod-turning device for plows, comprising an upturned cutting blade at the outer side of the share, a side-plate extending backwardly therefrom, a bottom extending back from the rear edge of the share, and a support for said plates and means to attach the same to the inner side of the moldboard of the plow.

2. A sod-turning device for plows, comprising an upturned blade at the outer side of the share, having a rearwardly and upwardly inclined front cutting edge, a side-plate extending back therefrom substantially parallel with the landside of the plow, a bottom to carry the furrow-slice while acted upon by the moldboard, and supporting means for the side and bottom adapted for attachment to the back side of the moldboard.

3. A sod-turning device for plows, comprising an upstanding blade at the outer side of the share, a side-plate extending backwardly therefrom, a slatted bottom to support the furrow-slice, a cross-bar connecting the side-plate and bottom, having an upstanding member adapted for adjustable attachment to the back side of the moldboard.

In testimony whereof I affix my signature in presence of two witnesses.

JAMES HUGHES.

Witnesses:
A. W. FLINN,
LUCILE PRENEY.

Copies of this patent may be obtained for five cents each, by addressing the "Commissioner of Patents, Washington, D. C."